UNITED STATES PATENT OFFICE.

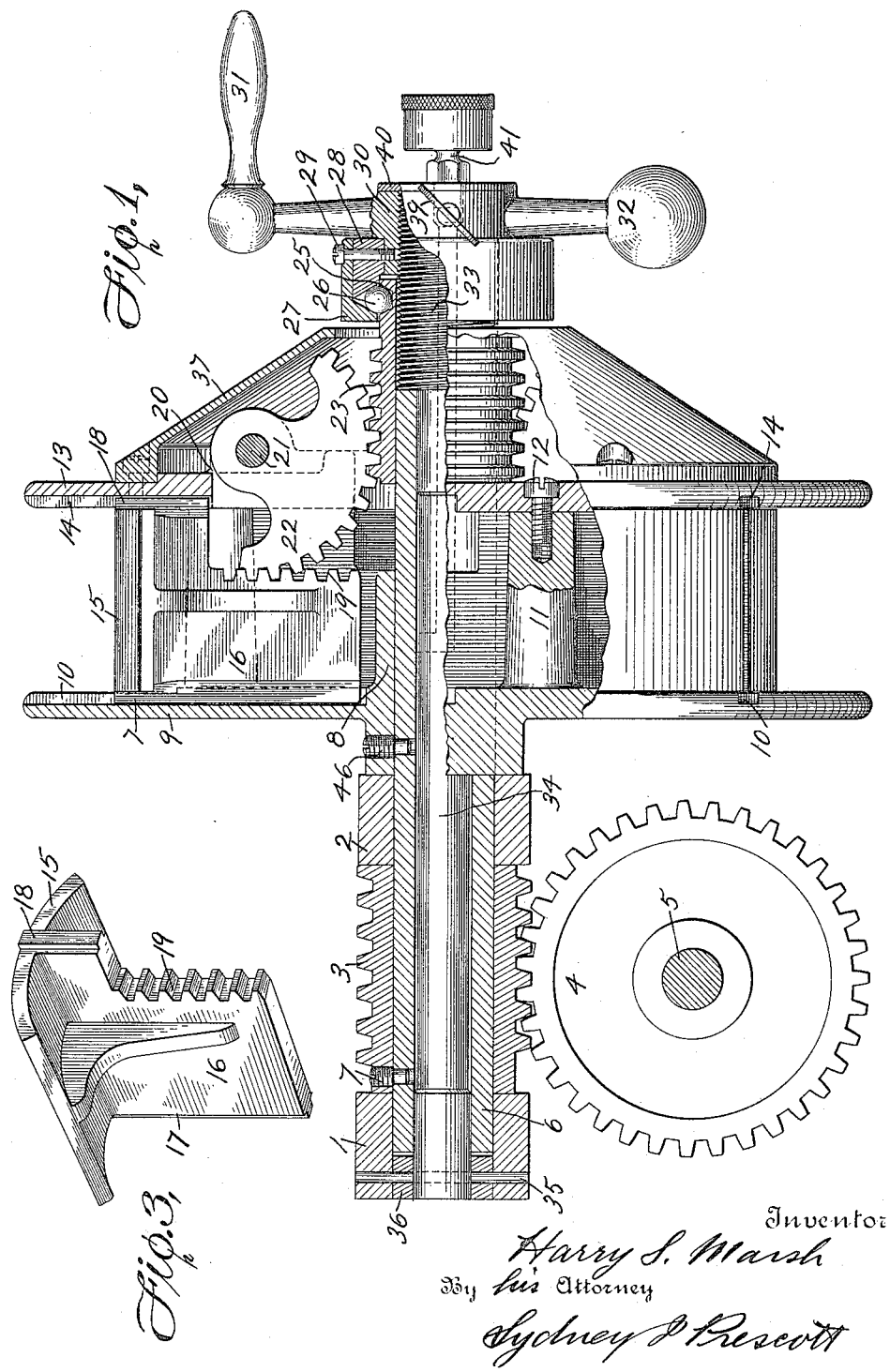

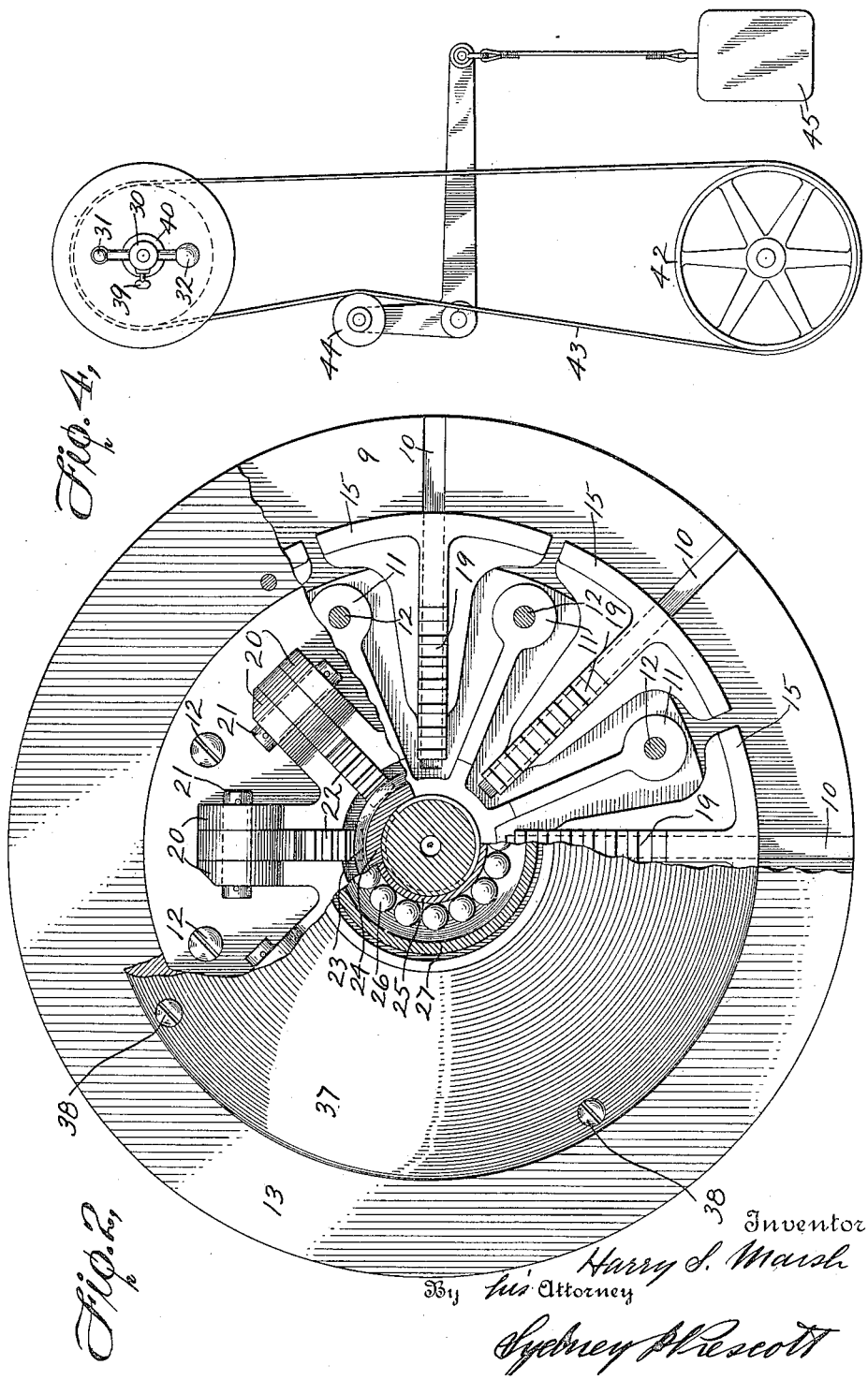

HARRY SEYMOUR MARSH, OF BROOKLYN, NEW YORK, ASSIGNOR TO AMERICAN MACHINE & FOUNDRY COMPANY, OF NEW YORK, N. Y., A CORPORATION OF NEW JERSEY.

EXPANDING PULLEY.

1,224,558.  Specification of Letters Patent. Patented May 1, 1917.

Application filed October 3, 1916. Serial No. 123,459.

*To all whom it may concern:*

Be it known that I, HARRY SEYMOUR MARSH, a citizen of the United States, residing at Brooklyn, New York, county of Kings, and State of New York, have invented a new and useful Improvement in Expanding Pulleys, of which the following is a specification.

This invention relates to an improvement in expanding pulleys, and has for its main object the production of a simple, strong, efficient and comparatively inexpensive device of this general character. The invention consists in certain parts, constructions and combinations, which will be hereinafter fully described and then specifically set forth in the claims hereunto appended.

In the accompanying drawings, which form a part of this specification and in which like characters of reference indicate the same or like parts, Figure 1 is a side elevation, partly broken away and partly in section, of a device constructed in accordance with the invention; Fig. 2 is a front elevation, partly broken away, of the device shown in Fig. 1; Fig. 3 is a detail perspective view of one of the belt segments shown in Figs. 1 and 2; and Fig. 4 is a diagrammatic view illustrating a method of driving the structure shown in Figs. 1 and 2.

In carrying the invention into effect, there is provided a series of rim segments, a stationary stud mounted between and projecting beyond the rim segments, and a belt segment controlling device in threaded engagement with said stud and arranged and adapted when manually operated on said stud to simultaneously produce radial motion of the rim segments. In the best constructions, the rim segment controlling device includes an operating member threaded upon said stud, a rim segment controlling member arranged and adapted to be moved longitudinally by and when the operating member is rotated upon the stud, and devices operated by the rim segment controlling member for simultaneously producing radial motion of the rim segments. In the best constructions also, gearing is employed for converting the longitudinal movement of the rim segment controlling member into the radial motion of the rim segments. The above elements may be varied in construction within wide limits. The device selected to illustrate the invention is but one of many possible concrete embodiments of the same, and the invention therefore is not to be restricted to the precise details of the structure shown and described.

Referring to the drawings, 1 and 2 indicate bearings carried by a machine in connection with which the pulley is used. 3 indicates a worm located between the bearings 1 and 2, which drives a worm-wheel 4 fixed upon a shaft 5 which is the main power shaft of the machine driven by the pulley. Mounted to rotate within the bearings 1 and 2 is a sleeve 6 which extends a suitable distance beyond the bearing 2. The worm 3 is mounted upon this sleeve 6 and caused to rotate therewith by means of a dowel set screw 7. Mounted upon the sleeve 6 just beyond the bearing 2 is a hub 8 having an integral flange 9 provided with a series of radial slideways 10. The hub 8 is secured to rotate with the sleeve by means of a dowel set screw 46. Extending from the flange 9 is a series of bosses 11 and to these bosses is secured, by means of screws 12, another flange 13 having radial slideways 14 corresponding to the slideways 10 of the flange 9, but shorter than the slideways 10. Mounted within the slideways 10 and 14 is a series of rim segments 15 each having a radial web 16, one edge of which is formed into an unbroken slide 17 extending substantially throughout its length and projecting beyond the operating belt surface of the segment. The other edge of each rim segment is formed in part into a slide 18 and in part into a rack 19 stepped back from the slide 18. The flange 13 before referred to is provided with a series of sister bosses 20, each carying a pin 21 upon which is mounted a gear segment 22 engaging the rack 19 of one of the rim segments. All of the gear segments 22 are in engagement with the annular teeth 23 of a controlling sleeve 24 loosely mounted upon the extreme end of the sleeve 6 before referred to and projecting beyond the end of said sleeve 6. By an inspection of Fig. 1, it will be readily understood that longitudinal movement imparted to the controlling sleeve 24 will, by reason of the engagement therewith of the gear segments 22 and the engagement of said gear segments with the rack 19, produce radial movement of the rim segments. The controlling sleeve 24 is provided with a race 25 in which is located a series of anti-friction balls 26. An outer race for the balls is formed by means of two rings 27—28, both held by means of screws 29 upon the hub of an operating member 30 having a handle 31 and a balancing counter-weight 32. The operating member is in threaded engagement with the enlarged head 33 of a stationary stud 34, the stud being mounted within the sleeve 6 before referred to and is held stationary by means of a pin 35 extending through the inner end of the stud, through a spacing ring 36, and the bearing 1.

A cover 37 is provided for the gear segments 22 and the controlling member 24, this cover being secured to the flange 13 by means of screws 38. A thumb set screw 39 is provided for preventing accidental displacement of the operating member 30 upon the threaded end 33 of the stud 34 after adjustment thereon. And a washer 40 is provided for limiting the movement of the operating member in one direction, this washer being held in place by means of a grease cup 41.

In Fig. 4, there is shown diagrammatically one means for driving the expanding pulley. This means includes a driving pulley 42, a belt 43, a belt tightener 44 and a weight 45, the operation of which is obvious from a mere inspection of Fig. 4.

In Figs. 1 and 2, the rim segments are shown in contracted position. When it is desired to expand the pulley in order to obtain slower speed, the operator first loosens the thumb set screw 39 and then rotates the operating member 30. As the rotation of this operating member causes it to move along the threaded end 33 of the stationary stud 34, the ball bearing carried thereby produces a longitudinal movement of the belt segment controlling sleeve 24 which is or may be rotating with the sleeve 6. This longitudinal movement of the controlling sleeve 24 causes all of the gear segments 22 to rotate upon their pins 21 and operate all of their racks 19 to force the rim segments 15 radially outward and thereby increase the effective diameter of the pulley. When the proper adjustment is made, the thumb set screw 39 is rotated to prevent accidental displacement of the operating member 30 upon the threaded end 33 of the stud 34. To readjust the pulley in the contracted position, it is merely necessary to loosen the thumb set screw 39 and rotate the operating member 30 in a reverse direction, after which the thumb set screw is again tightened.

What is claimed is:

1. A rim segment for expanding pulleys having a radial web one edge of which is formed into a slide with an unbroken surface, the opposite edge being in part formed into a slide and in part into a rack.

2. A rim segment for expanding pulleys having a radial web one edge of which is formed into a slide extending substantially throughout its length, the opposite edge being in part formed into a slide and in part into a rack.

3. A rim segment for expanding pulleys having a radial web one edge of which projects beyond the operating belt surface of the segment and is formed into a slide, the opposite edge being in part projected beyond the operating belt surface and formed into a slide and in part formed into a rack stepped back from the slide.

4. Operating mechanism for rim segments of expanding pulleys comprising a stationary stud mounted between and projecting beyond the rim segments, and a rim segment controlling device comprising rim segment actuating gearing and an operating member in threaded engagement with said stud arranged and adapted when manually operated on said stud to produce radial motion of the rim segments.

5. Operating mechanism for rim segments of expanding pulleys comprising a stationary stud mounted between and projecting beyond the rim segments, an operating member threaded upon said stud, a rim segment controlling member arranged and adapted to be moved longitudinally by and when the operating member is rotated upon the stud, and gearing operated by the rim segment controlling member for producing radial motion of the rim segments.

6. Operating mechanism for rim segments of expanding pulleys comprising a stationary stud mounted between and projecting beyond the rim segments, an operating member threaded upon said stud, a rim segment controlling sleeve having annular teeth arranged and adapted to be moved longitudinally by and when the operating member is rotated upon the stud, and gearing actuated by said annular teeth for producing radial motion of the rim segments.

7. Operating mechanism for rim segments of expanding pulleys comprising a stationary stud mounted between and projecting beyond the rim segments, an operating member threaded upon said stud, a rim segment controlling sleeve having annular teeth arranged and adapted to be moved longitudinally by and when the operating member is rotated upon the stud, and a series of gear segments operated by said annular teeth for simultaneously producing radial motion of the rim segments.

8. In an expanding pulley, the combination with a series of rim segments, of a stationary stud mounted between and projecting beyond the rim segments, and a rim segment controlling device comprising rim segment actuating gearing and an operating member in threaded engagement with said stud and arranged and adapted when manually operated on said stud to simultaneously produce radial motion of the rim segments.

9. In an expanding pulley, the combination with a series of rim segments, of a stationary stud concentrically mounted and projecting beyond the rim segments, and a rim segment controlling device comprising rim segment actuating gearing and an operating member in threaded engagement with said stud arranged and adapted when manually operated on said stud to simultaneously produce radial motion of the rim segments.

10. In an expanding pulley, the combination with a series of rim segments, of a stationary stud mounted between and projecting beyond the rim segments, an operating member threaded upon said stud, a rim segment controlling member arranged and adapted to be longitudinally moved by and when the operating member is rotated upon the stud, and gearing operated by the rim segment controlling member for simultaneously producing radial motion of the rim segments.

11. In an expanding pulley, the combination with a series of rim segments, of a stationary stud mounted between and projecting beyond the rim segments, an operating member threaded upon said stud, a rim segment controlling sleeve having annular teeth arranged and adapted to be longitudinally moved by and when the operating member is rotated upon the stud, and gearing operated by said teeth for simultaneously producing radial motion of the rim segments.

12. In an expanding pulley, the combination with a series of rim segments each having a radial web one edge of which is formed into a slide with an unbroken surface the opposite edge being in part formed into a slide and in part into a rack, of a stationary stud mounted between and projecting beyond the rim segments, and a rim segment controlling device including members in engagement with the rack of each rim segment and a member in threaded engagement with said stud arranged and adapted when manually operated on said stud to simultaneously produce radial motion of the rim segments.

13. In an expanding pulley, the combination with a series of rim segments each having a radial web one edge of which is formed into a slide extending substantially throughout its length the opposite edge being in part formed into a slide and in part into a rack, of a stationary stud mounted between and projecting beyond the rim segments, and a rim segment controlling device including members in engagement with the rack of each rim segment and a member in threaded engagement with said stud arranged and adapted when manually operated on said stud to simultaneously produce radial motion of the rim segments.

14. In an expanding pulley, the combination with a series of rim segments each having a radial web one edge of which projects beyond the operating belt surface of the segment and is formed into a slide the opposite edge being in part projected beyond the operating belt surface and formed into a slide and in part formed into a rack stepped back from the slide, of a stationary stud mounted between and projecting beyond the rim segments, and a rim segment controlling device including members in engagement with the rack of each rim segment and a member in threaded engagement with said stud arranged and adapted when manually operated on said stud to simultaneously produce radial motion of the rim segments.

15. In an expanding pulley, the combination with a series of rim segments each having a rack, of a stationary stud mounted between and projecting beyond the rim segments, an operating member threaded upon said stud, a rim segment controlling sleeve having annular teeth arranged and adapted to be moved longitudinally by and when the operating member is rotated upon the stud, and a series of segmental gears each in engagement with the rack of one of the rim segments and operated by the teeth of the rim segment controlling member for simultaneously producing radial motion of the rim segments.

16. In an expanding pulley, the combination with a rotatable sleeve, of a pair of pulley flanges mounted upon said sleeve to rotate therewith, a series of rim segments mounted between the flanges, a stationary stud positioned within the rotating sleeve, and a rim segment controlling device in threaded engagement with said stud arranged and adapted when manually operated on said stud to simultaneously produce radial motion of the rim segments.

17. In an expanding pulley, the combination with a rotatable sleeve, of a pair of pulley flanges mounted upon and to rotate with said sleeve, of a series of rim segments each radially slidable between said flanges and having a rack formed thereon, a stationary stud mounted within said sleeve, an operating member threaded upon said stud, a rim segment controlling sleeve having annular teeth arranged and adapted to be moved longitudinally by and when the operating member is rotated upon the stud, and a series of gear segments carried by one of the pulley flanges each being in engagement with the teeth of the rim segment controlling sleeve and with the rack of one of the rim segments.

In testimony whereof, I have signed my name to this specification.

HARRY SEYMOUR MARSH.

Copies of this patent may be obtained for five cents each, by addressing the "Commissioner of Patents, Washington, D. C."